US006941466B2

(12) United States Patent
Mastrianni

(10) Patent No.: US 6,941,466 B2
(45) Date of Patent: Sep. 6, 2005

(54) METHOD AND APPARATUS FOR PROVIDING AUTOMATIC E-MAIL FILTERING BASED ON MESSAGE SEMANTICS, SENDER'S E-MAIL ID, AND USER'S IDENTITY

(75) Inventor: Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 09/791,122

(22) Filed: Feb. 22, 2001

(65) Prior Publication Data

US 2002/0116641 A1 Aug. 22, 2002

(51) Int. Cl.[7] .......................... G06F 11/30; G06F 12/14; H04L 9/00; H04L 9/32
(52) U.S. Cl. ...................................................... 713/200
(58) Field of Search ................................ 713/154, 200; 340/5.2; 380/252; 705/51

(56) References Cited

U.S. PATENT DOCUMENTS

| | | | | |
|---|---|---|---|---|
| 6,065,056 A | * | 5/2000 | Bradshaw et al. | 709/229 |
| 6,324,569 B1 | * | 11/2001 | Ogilvie et al. | 709/206 |
| 6,389,472 B1 | * | 5/2002 | Hughes et al. | 709/229 |
| 6,546,390 B1 | * | 4/2003 | Pollack et al. | 707/7 |
| 6,609,196 B1 | * | 8/2003 | Dickinson et al. | 713/154 |
| 6,654,787 B1 | * | 11/2003 | Aronson et al. | 709/206 |
| 6,757,830 B1 | * | 6/2004 | Tarbotton et al. | 713/188 |
| 6,842,773 B1 | * | 1/2005 | Ralston et al. | 709/206 |

OTHER PUBLICATIONS

WebChaperone With Intelligent Filtering Technology Protects Children From Internet Pornography, Jan. 28, 1998, Newswire Association Inc., p. 1.*
Managing Your Identity on the Internet: Towards A Consumer Guide to Privacy Tools, Nov. 9, 2000, Cyberspace Policy Institute, Draft Report No. CPI–****, sections 3 and 4.*
Net Nanny User Guide, (C) 2000, Net Nanny Ltd., Version 4.*

* cited by examiner

*Primary Examiner*—Albert Decady
*Assistant Examiner*—Nadia Khoshnoodi
(74) *Attorney, Agent, or Firm*—Duke W. Yee; Louis P. Herzberg; Stephen R. Tkars

(57) ABSTRACT

A method, computer program product, and apparatus for providing context-aware automatic e-mail filtering and reply generation based on message semantics, sender's e-mail ID, and the user's identity is provided. In one embodiment, e-mail received from objectionable sources as determined by the sender's ID or the IP address from which the e-mail originate are deleted. In other embodiments, e-mail containing objectionable content as determined by the presence of objectionable words or phrases or by an objectionable score determined by assigning weights to various words and phrases that exceeds a threshold value. Other embodiments allow for attachments to be forwarded to a parent or system administrator and approval received from the parent or system administrator prior to allowing access to the attachment by the recipient.

27 Claims, 3 Drawing Sheets

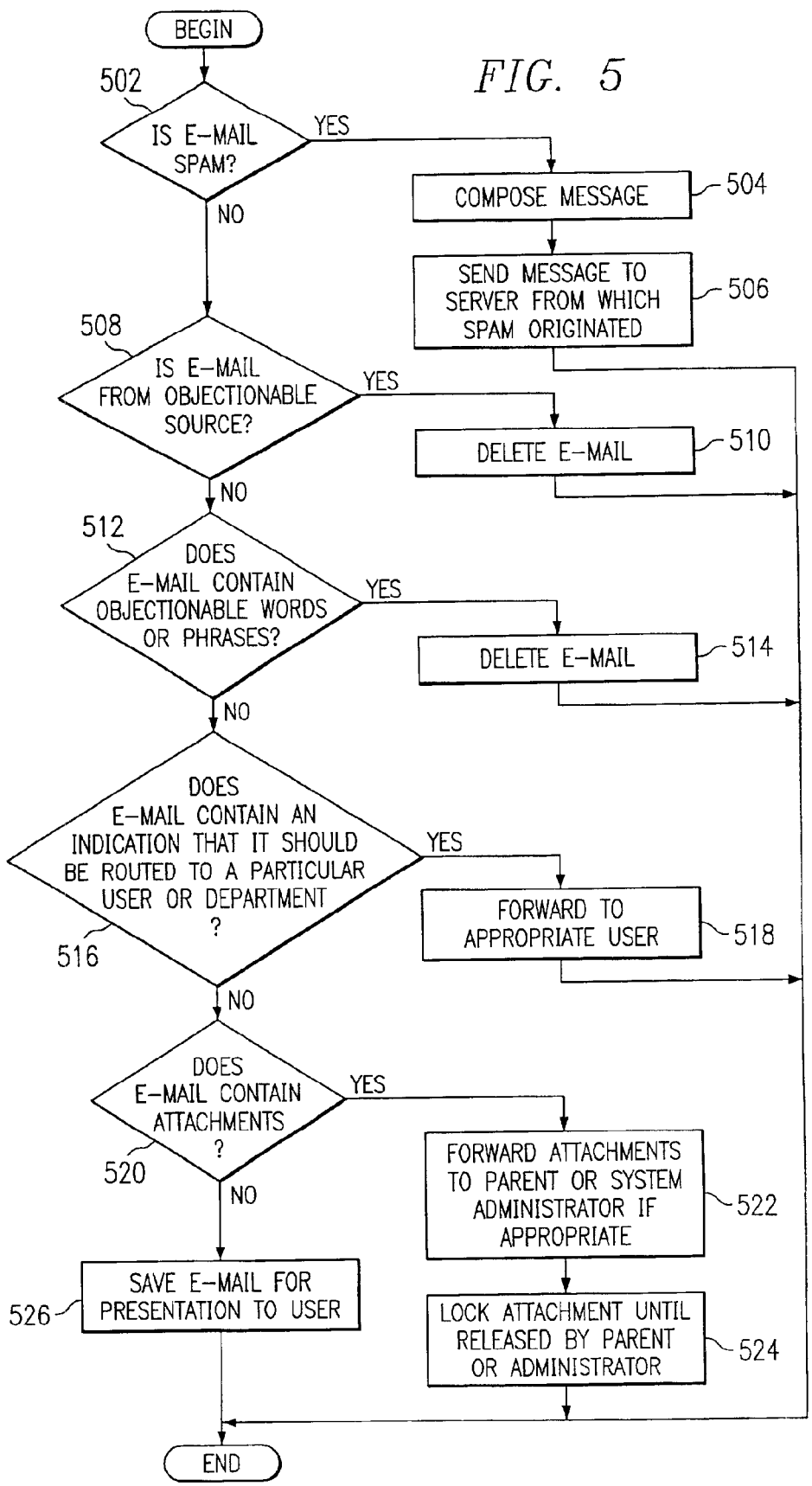

METHOD AND APPARATUS FOR PROVIDING AUTOMATIC E-MAIL FILTERING BASED ON MESSAGE SEMANTICS, SENDER'S E-MAIL ID, AND USER'S IDENTITY

BACKGROUND OF THE INVENTION

1. Technical Field

The present invention relates generally to data processing systems and, more particularly, to a method and apparatus for providing context-aware automatic e-mail filtering and reply generation.

2. Description of Related Art

Although personal computers have become less expensive and in general more powerful, they are still difficult to use. The basic icon-oriented display, desktop metaphor and mouse interface have changed little in the past two decades. Attempts to make PCs easier to use have all been focused around the current display, keyboard, and mouse. For the most part, designers have concentrated on making PCs easier to use by changing the behavior of those three standard components rather than changing the entire paradigm. In other words, developers keep trying the make old user interface work but have failed to look "outside the box" for alternative methods of user interaction.

Writing filters for e-mail and bulk e-mail messages referred to as SPAM is not a new technology. Most e-mail programs have some level of feature to filter e-mail messages by matching the user ID of the sender. While this has been somewhat successful in the past for filtering unwanted e-mail messages, bulk mail programs have become more sophisticated and generate random user IDs to foil the filtering software.

Current technology to determine the contents of an e-mail message have focused on providing the algorithms to determine the contents of the message using some form of message scanning. The scanning routine attempts to determine the contents of the message based on semantic rules. It would be desirable, however, to have an e-mail filtering program that filters out messages based on the user or sender's identification or IP address.

SUMMARY OF THE INVENTION

The present invention provides a method, computer program product, and apparatus for providing context-aware automatic e-mail filtering and reply generation based on message semantics, sender's e-mail ID, and the user's identity. In one embodiment, e-mail received from objectionable sources as determined by the sender's ID or the IP address from which the e-mail originate are deleted. In other embodiments, e-mail containing objectionable content as determined by the presence of objectionable words or phrases or by an objectionable score determined by assigning weights to various words and phrases that exceeds a threshold value. Other embodiments allow for attachments to be forwarded to a parent or system administrator and approval received from the parent or system administrator prior to allowing access to the attachment by the recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flowchart illustrating an exemplary process for applying filter definitions in accordance with the present invention.

DETAILED DESCRIPTION OF THE PREFERRED EMBODIMENT

Figure 1:
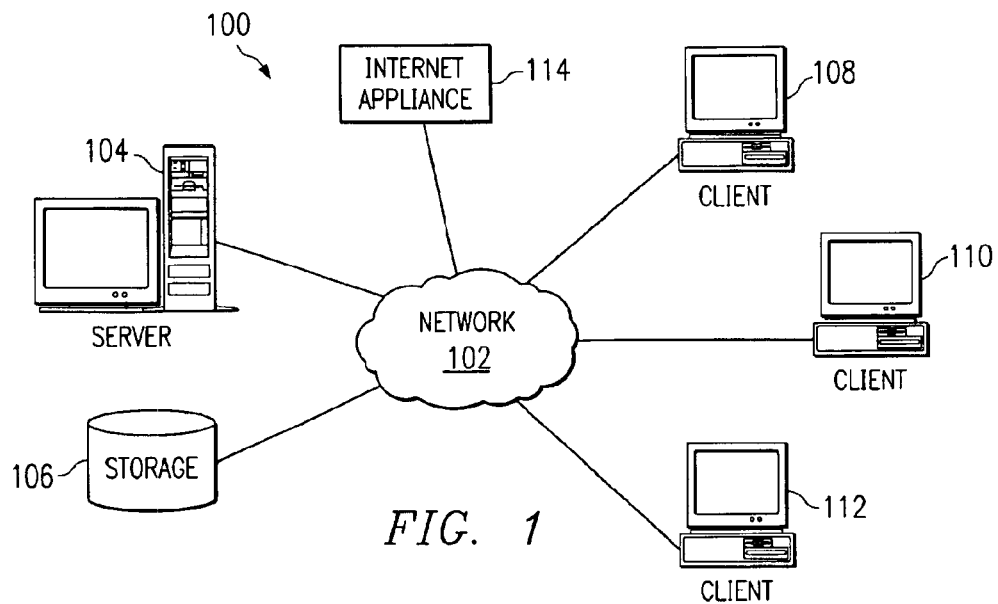
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
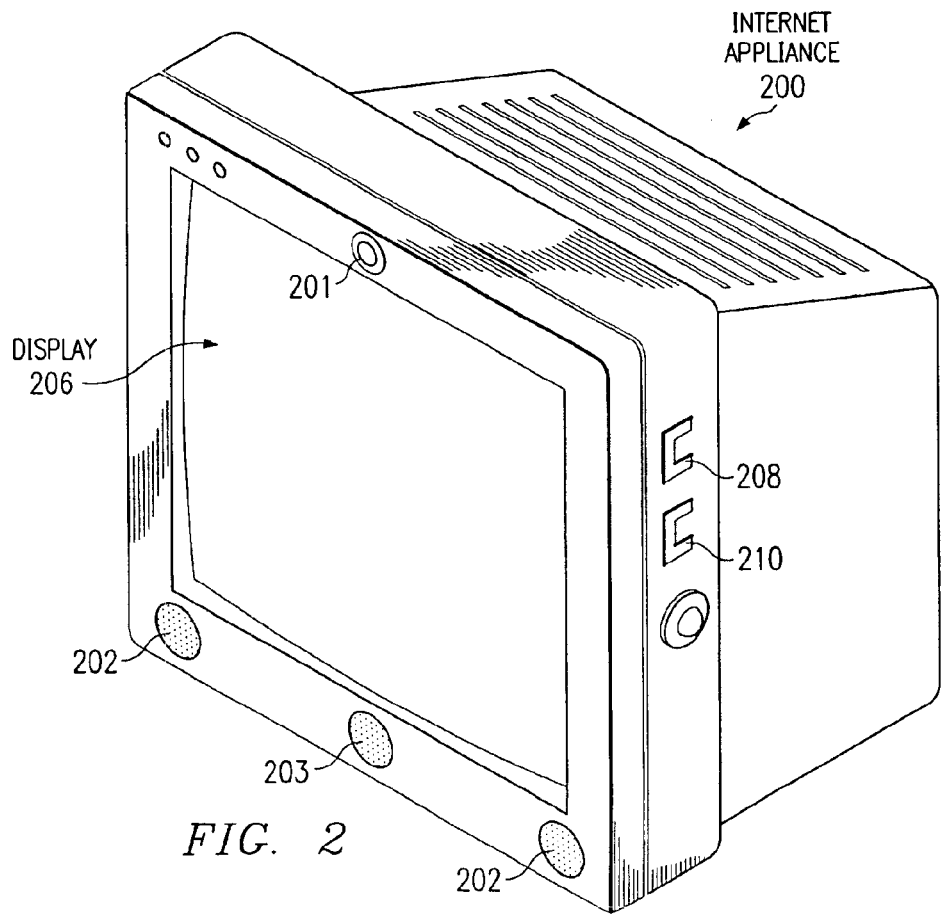
FIG. 2 depicts a pictorial diagram illustrating an Internet appliance in which the present invention may be implemented.
Figure 3:
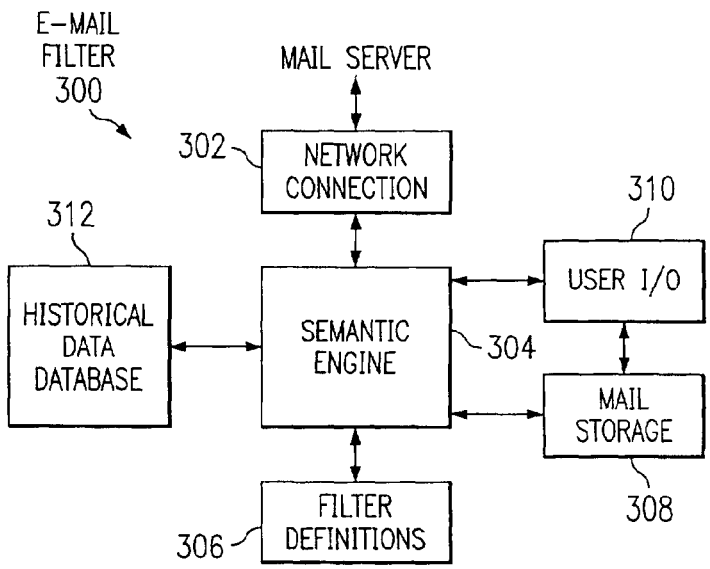
FIG. 3 depicts a block diagram of e-mail filtering software which may be implemented on an Internet appliance in accordance with a preferred embodiment of the present invention.

With reference now FIGS. 2 and 3, FIG. 2 depicts a pictorial diagram illustrating an Internet appliance and FIG. 3 depicts a block diagram of e-mail filtering software which may be implemented on an Internet appliance, such as Internet appliance 200 or any other type of device used for the sending or receiving of electronic mail, in accordance with a preferred embodiment of the present invention. Internet appliance 200 may be implemented as, for example, internet appliance 114 in FIG. 1. The Internet appliance 200 may be installed in a reasonable proximity to the user, preferably mounted flush to the wall or embodied in some other type of appliance such as a refrigerator, a stove, or any other common home appliance. The Internet appliance 200 described herein generally has no exposed keyboard or mouse, and relies on a touch screen 206, speakers 202, microphone 203, display 206, digital camera 201 and optional network connection 208 input and output. The absence of a touch screen 206, speakers 202, microphone 203, or digital camera 201 does not affect the fundamental operation of the present invention, but only affects the way data may be input or output.

The Internet appliance 200 has an operating system such as Windows 95®, Windows 98®, Windows NT®, or Linux® and appropriate hardware adapters such as a modem, cable modem, DSL modem, token-ring, or Ethernet, to connect to the network 102.

The Internet appliance 200 also includes appropriate software drivers installed to enable it to use the TCP/IP communication protocol over the hardware adapters. In addition, the Internet appliance 200 has all the necessary software applications that a user uses to manage its routine information management tasks. These applications include a web browser, a dialer and mail clients. The web browser may be embodied as, for example, Netscape Navigator® or Microsoft's Internet Explorer®; a dialer may be embodied as, for example, AT&T's Global network dialer; and mail clients can be embodied by, for example, Lotus Notes®, Microsoft Outlook®, or Eudora®.

A user normally uses the Internet appliance 200 to retrieve, read, compose, and send electronic mail over the Internet. The Internet appliance 200 can also be used to browse or view Internet Web pages using a dial-up network connection 210 or connection to a local area network 208. The user interacts with the Internet appliance 200 using the touch screen 206. The present invention may also reside on a third-party network or system, and the functions of the present invention provided as a business service. The present invention then acts as a "proxy" between the arriving mail and the Internet appliance or computer system.

E-mail received from a network mail server through network connection 302 passes through semantic engine 304 which, if configured to filter e-mail messages, analyzes the e-mail using filter definitions 306 and then saves, deletes, or forwards the e-mail based on matches or lack of matches between the e-mail and the filter definitions. E-mail that is to be stored for presentation to a user is stored in mail storage 308 from which a user may retrieve the e-mail through user input/output (I/O) 310. Semantic Engine 304 may also be configured to observe actions taken by the user and store these actions in a historical data database 312. Using the data in the historical data database, the semantic engine may automatically forward, save, or delete future e-mail messages received that have a user ID, originating IP address, or other characteristic in common with previously received e-mail based on the actions the user took with e previous e-mail.

The user configures the present invention by choosing from a list of topics and actions to perform using the touch screen 206. For example, if the user does not wish to be informed about gambling or casinos (a frequent source of junk mail), they can select the topic and choose the action to be performed: delete, forward, or save.

If the delete option is selected, any e-mail for that particular user that contains the matching content will be immediately deleted.

If the user selects save, the e-mail is saved normally and no action is taken.

If the user chooses the forward option, the mail can be automatically forwarded to a specified e-mail address.

If the user chooses SPAM, the e-mail is automatically forwarded to the administrator of the offending server, relay server, and ISP for disposition, and the mail deleted.

Depending on the context of the received e-mail, the Semantic Engine 304 will attempt to identify the topic of the e-mail message and will suggest an action from a list of pre-loaded actions and previously performed actions. The actions are presented to the user in a scrollable form and selected by the user's finger on the touch screen display 206.

When the present invention is installed in the Internet appliance 200, and the appliance is then connected to the network 102, the invention is invoked by the operating filtering software 300 installed in the Internet appliance 200 when an e-mail message arrives via the network 102, the message is examined by the Semantic Engine 304 for the selected content by topic, such as, for example, gambling, sex, work at home, etc. If the Semantic Engine 304 detects that the content of the e-mail meets the required criteria, the action associated with the topic is performed on the received e-mail.

A parental or manager function allows e-mail to be scanned per user or globally on the system. This allows, for example, a parent to configure the e-mail system not to accept messages with the word "sex" in them, or to delete all mail for a particular user.

When a valid, non-filtered or blocked e-mail arrives via the network 102, the "e-mail received" LED on the Internet appliance 200 illuminates to notify the user that an e-mail message has arrived. The user may read the mail normally and respond, save, or delete. If the user chooses to respond, the response is chosen from a list of responses generated by the Semantic Engine 304 in response to the content of the particular e-mail. The user then selects the appropriate response and pushes the Send key.

The Semantic Engine 304 can be configured to determine if a mail message contains a job application or resume, and route that particular e-mail to the human resources department.

The Semantic Engine 304 can be configured to Automatic Mode, leaving the decision of that what action to be taken up to the invention. The Semantic engine 304 "learns" by keeping track of the number of offending e-mail message IDs, domains, and relays, and uses that information to automatically filter offending e-mail messages without any operator intervention. It saves the historical data in a database 312 and refers to database 312 each time a new message arrives.

When the user views the mail, the invention can be configured to take a specific action upon the receipt of another similar e-mail. The user can select to the delete, save, forward, or SPA options based on the sender's ID or the topic as derived by the Semantic Engine 304. For example, a parent can have any offensive e-mail messages for their children forwarded to their account for review. Even if the message is deemed acceptable and has no offending content, parents or managers can have a copy of the received e-mail forwarded automatically to them. This "spy" mode is useful for parents checking up on their kids and for employers concerned with employees' activities.

The user can print the e-mail message using an optional printer attached to the local network.

If the e-mail includes an attachment such as a JPG or GIF file, the graphic will be displayed if the user touches the attachment using the touch screen display 206. If the attachment is a multimedia file, touching the attachment will cause the audio file to be played or the video file to be displayed.

The filter definitions 306 may be configured such that the semantic engine 304 may be the recipients ID is used to match or reject certain topics based on their user ID. For example, the invention can be configured to accept messages for John that include references to online gambling, but to filter messages for Sally that contain the same type of topics. This allows parents, for instance, to limit the content in e-mail directed toward a child's account, while allowing the message to be delivered to an adult. As another example, parents could elect to block all messages that come from the amazon.com domain from reaching a child's account, but allow those message to be sent to those accounts that are configured to receive them.

Another feature provided by the present invention is the ability to capture any attached files such as graphics, video, or audio, and automatically route them to a parent or employer for review. The e-mail recipient can see that an attachment has arrived but can't gain access to it until the parent or employer "clears" the file for viewing. Once cleared, the e-mail recipient is free to access the attachment normally.

Depending on certain settings, the invention will attempt to determine if the attachment contains objectionable material by scanning the attached file and file header information for embedded content such as file names, URLs, or other identifiers that contain any objectionable phrases or words. If found, the attachment is marked as "possible objectionable material" and forwarded to a parent or system administrator disposition.

The system can also block the receipt of e-mail messages by IP number. It is a common practice to use another server as a relay to make it appear that the e-mail was sent from that server, rather than from the real originator. Once the bulk e-mail program finds one of these servers to use as a proxy, it will continue to use that server until the administrator of the server disables the relay. The e-mail program will continue to use the server for as long as possible, changing the sender's user ID each time and forging the message headers.

To determine the message content, the system uses a Semantic Engine. The Semantic Engine 304 scans the e-mail content, retrieving certain verbs, adjectives, nouns, and other patterns of text. The Semantic Engine 304 uses a rules-based algorithm to attempt to determine the context of the message. This allows, for example, for the Semantic Engine to determine the a message from Aunt Tilly that says "the new skirt I just bought looks really sexy" does not have the same criteria as a message that contains "sexy girls online".

The Semantic Engine 304 works by assigning a weighted value to each objectionable noun, adjective, and verb, then calculating a sum and weighted average. This value is increased if the noun, adjective, or verb appears in an objectionable phrase. The resultant value is compared against a threshold value which can be changed by the manager or parent. Phrases such as "phone sex" are assigned a high numeric value equal to a value greater than the threshold value to insure that the message is filtered. The important aspect of the Semantic Engine is that the filter parameters including the threshold value are assigned on a "per-user" basis, allowing different filtering criteria to be applied to each user.

In another variation of this invention is that the functions of the invention can be provided as a service from a third part. Instead of the software installed locally on a user's computer, the filtering service can be provided by an internet service provider or any third-party service provider. In this case, the invention resides fully or partially on the third-party's equipment or network.

Figure 4:
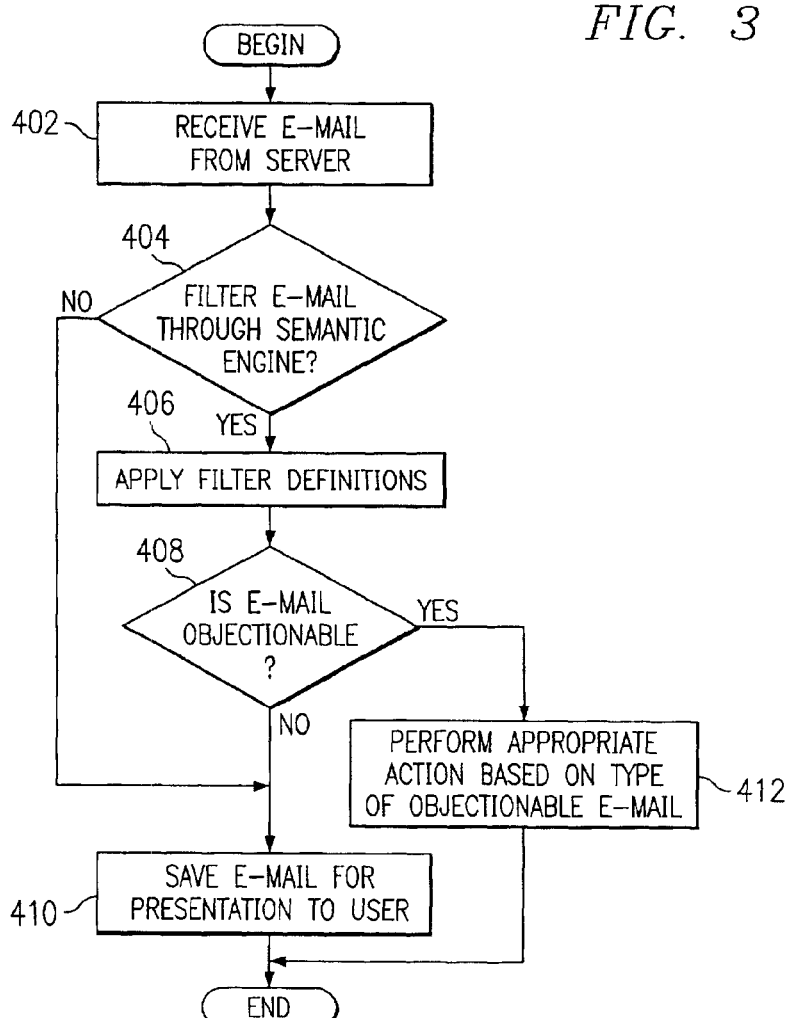
FIG. 4 depicts a flowchart illustrating an exemplary process for receiving e-mail through a e-mail filter in accordance with the present invention.

With reference now to FIG. 4, a flowchart illustrating an exemplary process for receiving e-mail through a e-mail filter is depicted in accordance with the present invention. Once a user has selected to download e-mail from an e-mail server, the server is accessed and the e-mail is received (step 402). The e-mail program then determines whether the user has selected to filter the e-mail through the semantic engine (step 404). If the user has selected not to filter the e-mail, then the e-mail is saved for presentation to the user (step 410). If, however, the filtering program has been selected by the user, then the semantic engine applies the filter definitions (step 406) and determines whether the e-mail is objectionable (step 408). If the e-mail is not objectionable, then the e-mail is saved for presentation to the user (step 410). If the e-mail is objectionable, then the semantic engine performs appropriate actions based on the type of objection triggered by the e-mail (step 412).

With reference now to FIG. 5, a flowchart illustrating an exemplary process for applying filter definitions is depicted in accordance with the present invention. This flowchart shows in more detail, examples of actions that may be taken in step 406–412 in FIG. 4. The semantic engine determines whether the e-mail is Spam (step 502). If the e-mail is spam, then the semantic engine composes a message (step 504) and sends the message to the administrator of the server from which the offending e-mail originated and deletes the e-mail (step 506).

If the e-mail is not spam, the semantic engine determines whether the e-mail is from an objectionable source (step 508) based upon, for example, the user identification of the sender or on the IP address from which the mail originated that has been previously identified as an objectionable source and stored as a filter definitions. If the e-mail is from an objectionable source, then the e-mail is deleted (step 510).

If the e-mail is not from an objectionable source, the semantic engine then determines whether the e-mail contains objectionable words or phrases (step 512). If the e-mail does contain objectionable words or phrases, then the e-mail is deleted (step 514). The semantic engine may determine whether the e-mail is objectionable based merely on the presence of certain words or may use an algorithm that assigns weights to certain words or phrases and if a threshold value is exceeded, the semantic engine determines that the e-mail is objectionable.

If the e-mail does not contain objectionable content, the semantic engine next determines whether the e-mail contains an indication that is should be routed to a particular user or department (step 516). If the e-mail does contain an indication that it should be forwarded, then the e-mail is forwarded to the appropriate user (step 518) based on information from within the e-mail. For example, if the e-mail contains a resume, then the e-mail is forwarded to the human resources department of the organization.

If the e-mail should not be forwarded to another recipient, the semantic engine determines whether the e-mail contains attachments (step 520). If the e-mail does contain attachments and the user to which the e-mail is directed is not authorized to received unscreened attachments, then the attachment is forwarded to a parent or system administrator (step 522) and the attachment is locked such that the user is prevented from viewing the attachment until it has been approved by the parent or system administrator (step 524). If the e-mail does not contain an attachment, the e-mail is saved for presentation to a user (step 526).

The order of the steps presented here may be altered in other embodiments. Furthermore, other steps not shown may be added, some steps removed, or some steps performed simultaneously with other steps. Also, in other embodiments, some of the steps that are depicted as mutually exclusive may not be mutually exclusive in other embodiments.

While the invention has been described in terms of preferred embodiments, those skilled in the art will recognize that the invention can be practiced with modification within the spirit and scope of the appended claims.

For example, while the exemplary implementation above has been described with regard to a portable computing device (e.g., a laptop computer), other devices such as personal data assistants (PDAs), Palm Pilots, portable telephones, products such as MobilePro produced by Sharp Corporation, etc. will find equal benefit with the features of the present invention.

It is also important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of filtering electronic mail, the method comprising:

receiving an electronic mail message intended for a first recipient address;

identifying filtering definitions associated with the first recipient address;

determining whether a portion of the electronic mail message is a candidate for review by a screening user based on the filtering definitions;

responsive to a portion of the electronic mail message being a candidate for review, locking access to the portion of the electronic mail message to form a locked portion, wherein a user associated with the first recipient address cannot gain access to the locked portion until the locked portion is approved by the screening user; and forwarding the locked portion of the electronic mail message to a second recipient address associated with the screening user.

2. The method as recited in claim 1, the method further comprising:

determining whether the electronic mail message originated from objectionable source based on the filtering definitions associated with the first recipient; and responsive to a determination that the electronic mail message originated from an objectionable source, deleting the electronic mail message without presentation of the electronic mail message to the user associated with the first recipient address.

3. The method as recited in claim 2, wherein the determination that the electronic mail message originated from an objectionable source is made based on a sender's user name.

4. The method as recited in claim 2, wherein the determination that the electronic mail message originated from an objectionable source is made based on an Internet Protocol address from which the electronic mail message originated.

5. The method as recited in claim 1, the method further comprising:

determining whether the electronic mail message contains objectionable content; and responsive to a determination that the electronic mail message contains objectionable content, deleting the electronic mail message with presentation of the electronic mail message to the screening user.

6. The method as recited in claim 5, wherein the determination that the electronic mail message contains objectionable content is based on a determination that an objectionable phrase is present within the electronic mail message.

7. The method as recited in claim 5, wherein the determination that the electronic mail message contains objectionable content is based on a determination that an objectionable score calculated by assigning weights to certain objectionable words and phrases exceeds a threshold value.

8. The method as recited in claim 1, wherein that the portion of the electronic mail message is an attachment.

9. The method as recited in claim 8, wherein determining whether a portion of the electronic mail message is a candidate for review includes scanning the attachment for embedded content.

10. A computer program product in a computer readable media for use in a data processing system for filtering electronic mail, the computer program product comprising:

first instructions for receiving an electronic mail message addressed to a first recipient;

second instructions for identifying filtering definitions associated with the first recipient;

third instructions for determining whether a portion of the electronic mail message is a candidate for review by a screening user based on the filtering definitions;

fourth instructions responsive to a portion of the electronic mail message being a candidate for review, for locking access to the portion of the electronic mail message to form a locked portion, wherein a user associated with the first recipient address cannot gain access to the locked portion until the locked portion is approved by the screening user; and fifth instructions for forwarding the locked portion of the electronic mail message to a second recipient address associated with the screening user.

11. The computer program product as recited in claim 10, the computer program product further comprising:

instructions for determining whether the electronic mail message originated from an objectionable source based on the filtering definitions associated with the first recipient; and instructions, responsive to a determination that the electronic mail message originated from an objectionable source, for deleting the electronic mail message without presentation of the electronic mail message to the user associated with the first recipient address.

12. The computer program product as recited in claim 11, wherein the determination that the electronic mail message originated from an objectionable source is made based on a sender's user name.

13. The computer program product as recited in claim 11, wherein the determination that the electronic mail message originated from an objectionable source is made based on an Internet Protocol address from which the electronic mail message originated.

14. The computer program product as recited in claim 10, the computer program product further comprising:

instructions for determining whether the electronic mail message contains objectionable content; and instructions, responsive to a determination that the electronic mail message contains objectionable content for deleting the electronic mail message with presentation of the electronic mail message to the screening user.

15. The computer program product as recited in claim 14, wherein the determination that the electronic mail message contains objectionable content is based on a determination that an objectionable phrase is present within the electronic mail message.

16. The computer program product as recited in claim 14, wherein the determination that the electronic mail message contains objectionable content is based on a determination that an objectionable score calculated by assigning weigh to certain objectionable words and phrases exceeds a threshold value.

17. The computer program product as recited in claim 10, wherein the portion of the electronic mail message is an attachment.

18. The computer program product as recited in claim 17, wherein determining whether a portion of the electronic mail message is a candidate for review includes scanning the attachment for embedded content.

19. An electronic mail filtering system, the system comprising:

a network interface which receives an electronic mail message intended for a first recipient address; and a semantic engine having a first component, a second component, a third component, and a fourth component; wherein the first component identifies filtering definitions associated with the first recipient address;

the second component determines whether a portion of the electronic mail message is a candidate for review by a screening user based on the filtering definitions;

the third component, responsive to a portion of the electronic mail message being a candidate for review, locks access to the portion of the electronic mail message to form a locked portion, wherein a user associated with the first recipient address cannot gain access to the locked portion until the locked portion is approved by the screening user; and forwarding the locked portion of the electronic mail message to a second recipient address associated with the screening user.

20. The system as recited in claim 19, wherein the semantic engine comprises a objectionable mail deletion component which, responsive to a determination that the electronic mail message originated from an objectionable source, deletes the electronic mail message without presentation of the electronic mail message to the user associated with the first recipient address.

21. The system as recited in claim 20, wherein the objectionable mail deletion component uses a sender's user name to determine whether that the electronic mail message originated from an objectionable source.

22. The system as recited in claim 20, wherein the objectionable mail deletion component uses an Internet Protocol address from which the electronic mail originated to determine whether the electronic mail message originated from an objectionable source.

23. The system as recited in claim 19, wherein the semantic engine includes an objectionable mail deletion component which, responsive to a determination that the electronic mail message contains objectionable content, deletes the electronic mail message after presentation of the electronic mail message to the screening user.

24. The system as recited in claim 23, wherein the semantic engine includes an objectionable phrase determination component which makes a determination of whether the electronic mail message contains objectionable content based on a determination that an objectionable phrase is present within the electronic mail message.

25. The system as recited in claim 23, wherein the semantic engine determines whether the electronic mail message contains objectionable content based on a determination of whether an objectionable score calculated by assigning weights to certain objectionable words and phrases exceeds a threshold value.

26. The system as recited in claim 19, wherein the portion of the electronic mail message is an attachment.

27. The system as recited in claim 26, wherein the semantic engine, determines whether a portion of the electronic mail message is a candidate for review by scanning the attachment for embedded content.

* * * * *

UNITED STATES PATENT AND TRADEMARK OFFICE
CERTIFICATE OF CORRECTION

PATENT NO. : 6,941,466 B2
DATED : September 6, 2005
INVENTOR(S) : Mastrianni

It is certified that error appears in the above-identified patent and that said Letters Patent is hereby corrected as shown below:

Title page,
Item [74], *Attorney, Agent, or Firm*, delete "Stephen R. Tkars" and insert -- Stephen R. Tkacs --.

Column 8,
Line 4, after "from" insert -- an --.

Column 9,
Line 22, after "contact" insert -- , --.
Line 33, after "assigning" delete "weigh" and insert -- weights --.

Column 10,
Line 48, after "engine" delete ",".

Signed and Sealed this

Seventh Day of February, 2006

JON W. DUDAS
*Director of the United States Patent and Trademark Office*